(12) United States Patent
Koechner et al.

(10) Patent No.: US 11,178,853 B2
(45) Date of Patent: Nov. 23, 2021

(54) POULTRY CAGE

(71) Applicant: Koechner Mfg. Co., Inc., Tipton, MO (US)

(72) Inventors: Mark William Koechner, Tipton, MO (US); Clay Austin Blake, Fortuna, MO (US)

(73) Assignee: KOECHNER MFG. CO., INC., Tipton, MO (US)

( * ) Notice: Subject to any disclaimer, the term of this patent is extended or adjusted under 35 U.S.C. 154(b) by 175 days.

(21) Appl. No.: 16/587,619

(22) Filed: Sep. 30, 2019

(65) Prior Publication Data

US 2021/0092939 A1 Apr. 1, 2021

(51) Int. Cl.
*A01K 31/00* (2006.01)
*A01K 45/00* (2006.01)
*A01K 31/02* (2006.01)
*B65D 21/02* (2006.01)

(52) U.S. Cl.
CPC .......... *A01K 31/002* (2013.01); *A01K 31/02* (2013.01); *A01K 45/005* (2013.01); *A01K 2227/30* (2013.01); *B65D 21/0211* (2013.01)

(58) Field of Classification Search
CPC ... A01K 31/002; A01K 31/02; B64D 21/0211
See application file for complete search history.

(56) References Cited

U.S. PATENT DOCUMENTS

| | | | | |
|---|---|---|---|---|
| 1,040,489 | A * | 10/1912 | Baker | A01K 31/002 119/494 |
| 1,425,587 | A * | 8/1922 | Leslie | A01K 31/08 220/6 |
| 1,474,508 | A * | 11/1923 | Benson | A01K 31/002 220/6 |
| 3,866,787 | A * | 2/1975 | Allegri | B65D 21/0211 220/485 |
| 3,907,150 | A * | 9/1975 | Jurasek | B65D 19/10 220/485 |
| 4,015,743 | A * | 4/1977 | Beretta | B65D 7/26 220/485 |
| 6,694,918 | B2 | 2/2004 | Draft | |
| 6,848,987 | B2 | 1/2005 | Draft | |
| 7,261,059 | B2 | 8/2007 | Draft | |

FOREIGN PATENT DOCUMENTS

DE          2946783 A1 *  5/1981  ......... B65D 21/0211

* cited by examiner

*Primary Examiner* — Jessica B Wong
(74) *Attorney, Agent, or Firm* — McKee, Voorhees & Sease, PLC (57) ABSTRACT

A cage and corresponding method for loading, transporting, and unloading poultry utilize a substantially vertical track attached to a leg or a sidewall to provide stability for a door of the cage throughout the door's entire range of motion. The cage is stackable and together with like cages can form an assembly of cages. The assembled stack of cages allows for several cages to share common components. Thus, the weight of the load during transport is reduced and more livestock can be transported. Shared components can include a roof and even a latching mechanism which prevents the door of each cage from coming open during transport.

16 Claims, 6 Drawing Sheets

POULTRY CAGE

FIELD OF THE INVENTION

The present invention relates generally to a stackable cage for use in at least the poultry industry, typically for holding and transporting turkeys, chickens, and the like.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Poultry farming is the process of raising domesticated birds such as chickens, ducks, turkeys, and geese for the purpose of farming meat or eggs for food. The national organizations overseeing aspects of poultry production in the United States are the Food and Drug Administration (FDA) and the United States Department of Agriculture (USDA).

Battery cages are used for various animal production methods but are used primarily for housing egg-laying female birds. The battery cage is named as such due to the arrangement of rows and columns of identical cages connected together, in a unit, as in an artillery battery.

Male birds, on the other hand, are often raised at one location and butchered at another. Historically, the means for transporting and stunning domestic birds was quite labor intensive. To reduce reliance on manual labor, recent technical developments in the poultry industry have led to the use of partially automated cages to allow for the more inexpensive transport of poultry.

One such cage is the "Draft cage" of U.S. Pat. Nos. 6,694,918 and 7,261,059. However, the Draft cage and other known cages are unnecessarily inefficient. For example, loading and unloading poultry into the Draft cage is difficult. Components are often repeated when using multiple cages for transport, resulting in a heavier load during transport and allowing for the transport of fewer birds. No guides are included other than a few slide rods from which the door hangs. As a result, the door of the Draft cage is unstable and prone to binding up. Finally, the locking mechanisms associated with the Draft cage are not very secure and/or cannot be used with one hand.

Therefore, a need exists in the art for an improved cage which overcomes the deficiencies of the Draft cage and other known cages.

It is therefore a primary object, feature, and/or advantage of the present invention to provide such an improved cage.

It is still yet a further object, feature, and/or advantage to provide a stackable cage and to incorporate said stackable cage into an assembly comprising several cages.

It is still yet a further object, feature, and/or advantage to reduce the need for duplicate components within assemblies of several cages. For example, a roof may be provided with only the top cage of a stack of cages.

It is still yet a further object, feature, and/or advantage to more fully automate components of the cage to further reduce reliance on manual labor.

It is still yet a further object, feature, and/or advantage of the present invention to provide a cage that may be used in a wide variety of applications. For example, while the cage is envisioned to easily hold and transport poultry, the cage can still facilitate the holding and transport of wild game, other types of livestock, and/or non-living things.

It is still yet a further object, feature, and/or advantage of the present invention to provide a safe, cost effective, and durable cage. For example, the cage should be easily configured to accommodate winter conditions.

It is still yet a further object, feature, and/or advantage of the present invention to provide a cage including a distinct aesthetic appearance.

It is still yet a further object, feature, and/or advantage of the present invention to practice methods which facilitate use, manufacture, assembly, maintenance, and repair of a cage accomplishing some or all of the previously stated objectives.

It is still yet a further object, feature, and/or advantage of the present invention to facilitate the butchering of livestock in compliance with the law, including any applicable regulations set forth by the United States Food and Drug Administration (FDA) and/or the United States Department of Agriculture (USDA).

The previous objects, features, and/or advantages of the present invention, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part, as would be understood from reading the present disclosure.

SUMMARY OF THE INVENTION

According to some aspects of the present disclosure, a stackable cage for holding and transporting livestock comprises a floor; a sidewall extending perpendicularly from the floor in an upward direction until the sidewall meets a slide rod substantially parallel with the floor; a substantially vertical track running along the sidewall; and a door. The door comprises, towards a top of the door, a substantially horizontal rod slidable along the slide rod; and towards a bottom of the door, an attachment to the substantially vertical track such that the door rides along the substantially vertical track as the door is moved from a closed position to an open position.

According to some additional aspects of the present disclosure, the cage can further comprise at least two legs extending perpendicularly from the floor in an upward direction with the sidewall therebetween. The sidewall can comprise wire panels to keep livestock contained within the stackable cage and/or solid panels to block wind and provide shelter for the livestock during transport. Similarly, the door can comprise grid wire, and preferably, grid wire sized to prevent feathers from poultry from being expelled from the cage.

According to some further aspects of the present disclosure, the cage includes several components which more fully automate the cage. For example, the slide rod can comprise a hinge point about which the substantially horizontal rod pivots and thus allow the door to swing outwardly as the stackable cage is tipped forward. The substantially horizontal rod can be attached to a door ring thus allowing the substantially horizontal rod to slide along the slide rod. A door hook can be included towards a top of the substantially vertical track to retain the door in the open position and a nearby stop (e.g., a stop located at the top of the door or towards the top of the substantially vertical track) can prevent the door from coming out of the substantially vertical track or the door hook. A detent rod within the floor can, at least temporarily, retain the attachment to the substantially vertical track while the stackable cage is in the closed position. A latching mechanism can prevent the door from swinging outward during transport. A lifting lug at an upper corner of the sidewall can allow for the cage to be lifted by a hoist or other suitable machine.

According to some other aspects of the present disclosure, an assembly of stackable cages having multiple floors comprises at least two stackable cages according to any one or more of the aspects described above. Stackable cages on lower floors of the assembly need not include a roof while stackable cages on the top floor of the assembly typically do. The cages may be stacked, at least in part, through the use of a cradle towards a top of the sidewall of the cage.

According to some additional aspects of the present disclosure, the assembly can further comprise a latching mechanism. The latching mechanism can comprise a substantially vertical pipe traversing the multiple floors. The substantially vertical pipe passes through several knuckles to allow hinged movement of the vertical pipe. The hinged movement of the vertical pipe allows a latch at each floor will to swing towards its corresponding door and prevent the door from swinging outward during transport. The assembly can include at least one keeper, such as a hook attached to a stackable cage on the bottom floor of the assembly, for retaining at least one latch in a transport position.

According to some other aspects of the present disclosure, a method for transporting livestock comprises loading the livestock into a cage while a door of the cage is retained in an open position, at least in part, by a hook located towards a top of a substantially vertical track, said track substantially traversing a height of the cage, moving the door from the open position to a closed position by allowing an attachment to the substantially vertical track to ride downward against the substantially vertical track until the door rests against a floor of the cage, and unloading the livestock from the cage by tipping the cage forward, thus allowing the door to swing outwardly and the livestock to fall out of the cage.

According to some additional aspects of the present disclosure, the method can further comprise lifting the cage by a lifting lug attached to the cage onto a truck for transport, stacking the cage onto another cage, and/or latching doors of the cage assembly shut during transport with a common latching mechanism.

These and/or other objects, features, advantages, aspects, and/or embodiments will become apparent to those skilled in the art after reviewing the following brief and detailed descriptions of the drawings.

Several embodiments in which the present invention may be practiced are illustrated and described in detail, wherein like reference numerals represent like components throughout the several views. The drawings are presented for exemplary purposes and may not be to scale, unless otherwise indicated, and thus proportions of features in the drawings shall not be construed as evidence of actual proportions.

DETAILED DESCRIPTION OF THE INVENTION

Definitions—Introductory Matters

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, sides, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

Overview

The cages described herein may be incorporated into a sub-assembly of cages having multiple floors, said sub-assembly having more than one entrance and being capable of housing more than one animal. The cage or a sub-assembly of cages may then be stacked into an assembly of like cages, preferably having between four and six floors, however embodiments with more or less floors are certainly possible. The size of the cage can vary based on the size of the livestock being transported, where in the assembly of like cages the specific cage or sub-assembly is located (e.g., it may be preferred that smaller cages or sub-assemblies be placed on higher floors), and/or the capabilities of the operator hauling livestock (e.g., smaller/lighter cages may need to be used if the operator has a less powerful hoist or less space to store the cages). The cages preferably comprise materials which effectively balance cost and weight with durability and rigidity, such as stainless steel.

More particularly with reference to the drawings, various positions of a cage 100 for holding and transporting livestock are shown in FIGS. 1-4. Each individual cage 100 includes a frame 102 for supporting a floor 104, such as a solid floor panel, during transport of poultry. The floor 104 is either removably fixed to the lower frame 102, such as with a fastener, biasing mechanism, or simply a gravitational force, or is permanently fixed to the frame 102, such as with a weld. Thus, when the cage 100 is in an upright position, the floor 104 sits on top of the frame 102 and can support the weight of livestock contained therein. For assemblies of cages 100, cages 100 positioned adjacent one another within the same floor can share the solid floor panel 104. Cages 100 positioned on lower floors are able to utilize the solid floor panel 104 of cages 100 directly above as a roof.

Legs 106 are welded or otherwise attached to the frame 102. The legs 106 extend upward from and substantially perpendicular to the frame 102. In a preferred embodiment, there are four legs 106 at the lower corners of the cage 100, however alternative configurations exist where more or less legs 106 are included.

Likewise, sidewalls 108 extend upward from and substantially perpendicular to the frame 102. The sidewalls 108 extend until the sidewall meets or passes beyond a slide rod 122 substantially parallel with the frame 102. The sidewalls 108, for example, can be positioned between two legs 106 such that they traverse the depth or width of the cage 100. The sidewalls 108 comprise panels 110, such as solid and/or wire panels. The panels 110 hang from horizontal rods included with the cage 100 or can attach to one another such that each panel 110 supports adjacent panels 110 such that no horizontal rods are necessary. Wire panels effectively form a screen, having a mesh pattern dense enough such that livestock cannot exit the cage 100. In a preferred embodiment, the wire panels are sized such that biological debris (e.g., feathers) from livestock cannot exit the cage 100, e.g., blow onto the road, during transport. The wire panels can include some bent wire panels towards a portion of the cage 100 closest to the cage floor. In use, this prevents birds from getting a wing or foot stuck out of the cage under the side wire by moving the bottom of the wire in, approximately one inch. The use of bent wire panels also allows for easier cleanout. Solid panels are particularly helpful for winterizing the cage, i.e., blocking wind and providing shelter for livestock during transport. To conserve components within an assembly of cages 100, it may only be necessary to include solid panels on the outer cages 100.

At the top of the legs 106 and/or sidewalls 108, the cages 100 positioned on the top floor will typically include a solid roof 112, there being no solid floor panel 104 of a cage 100 directly above.

The cage 100 includes a door 114 having a grid wire body 116. The grid wire body 116 comprising a multitude of both horizontal and vertical wires to form the mesh or grid. The door 114 also includes, at a lower edge, a lower horizontal rod 118 and, at an upper edge, an upper horizontal rod 120. The lower horizontal rod 118 and the upper horizontal rod 120 extend past the grid wire body 116 of the door 114. The upper horizontal rod 120 operatively hangs from two slide rods 122 operatively attached towards the top of the sidewalls 108 or similar upper structure or even at a location beneath where the floor 104 attaches to the frame 102. If attached beneath the floor 104, the slide rods 122 of one cage 100 will be utilized by the cage 100 directly below. The slide rods 122 are substantially parallel with the floor 104, and as a result, are substantially perpendicular to the legs 106 of the cage 100 and substantially perpendicular to the door opening. Along a longitudinal axis of the slide rod 122, the slide rod 122 begins towards the front of the cage 100, substantially traverses the depth of the cage 100, and terminates towards the rear of the cage 100.

As shown in the figures, allowing the door 114 to hang from the slide rods 122 are door rings 124. These door rings 124 are welded or otherwise attached to the door 114 or the upper horizontal rod 120. The door rings 124 are typically a steel rod formed in the shape of the letter "D" with the flat, unbent portion of the door ring 126 being the portion which is attached to the door 114. Door rings 124 of other shapes, such as those formed in the shape of the letter "O" may also be used. Furthermore, any suitable means for allowing the door 114 to hang from the slide rods 122 may be used in lieu of or in combination with the door rings 124. For example, substantially horizontal tracks may be included.

As the door 114 slides with respect to the slide rod 122, the cage will move through the various positions seen in FIGS. 1-4. It follows that the slide rod 122 should be of sufficient strength and durability to easily support the weight of the door 114, no matter the position of the door. Unnecessary friction between the slide rods 122 and the door 114 should be avoided. To that end, tracks 126 help facilitate movement between open and closed positions of the door 114. The tracks 126 are preferably substantially vertical flat plates attached to an inward side of the legs 106 and/or a portion of the sidewalls 108, on both sides of the door opening. The tracks 126 are parallel to one another and can extend in a substantially perpendicular direction from the frame 102 and floor 104 or at a slight angle from the perpendicular direction to the frame 102 and floor 104. The tracks 126 provide a surface for the lower horizontal door rod 118 to ride against, while still allowing for the bottom of the door 114 to swing outward from the cage 100. The tracks 126 also keep the door 114 from binding on the slide rod 122; and from kicking sideways, in, and/or out as the door 114 is raised and lowered. Other suitable means for attaching the door 114 to the tracks 126 may be used in lieu of lower horizontal rod 118. Where substantially horizontal tracks (in lieu of slide rods 122) and substantially vertical tracks 126 are included, it may be particularly beneficial to design the door 114 with several sections such that when the door 114 travels from the closed position to the open position (upwards along the tracks 126), the sections do not interfere with as much space inside of or outside of the cage 100 as a result of each section having their own connection to the tracks 126.

Figure 1:
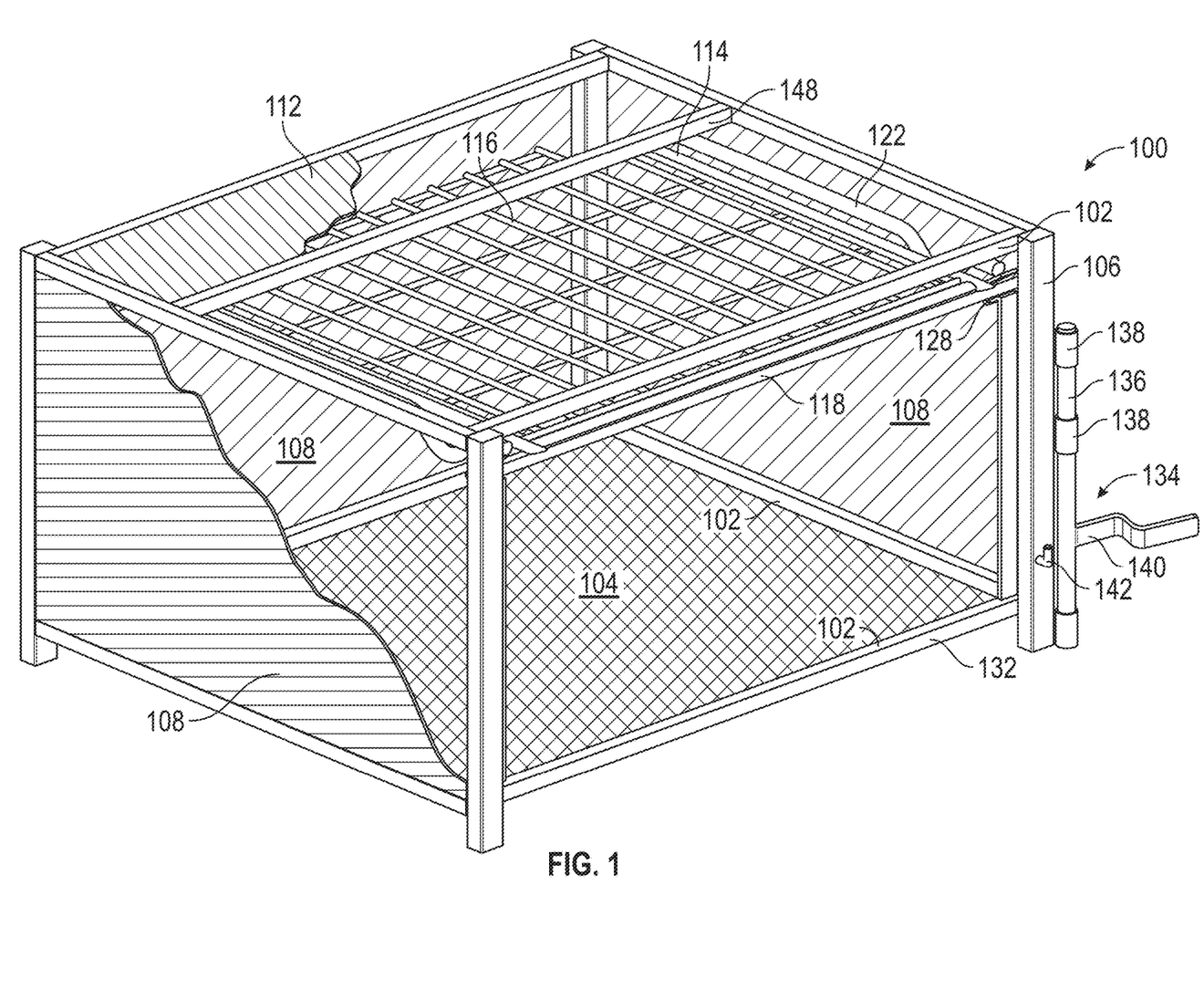
FIG. 1 shows a perspective view of a cage in an open and loading position, according to some aspects of the present disclosure.

In operation, if it is desired to load livestock, such as poultry, into the cage 100, the door 114 may be pushed inwards, upwards along the tracks 126, and towards the inside of the cage 100 to an open position, as shown in FIG. 1. In the open position, the door 114 is substantially parallel to the slide rods 122 and located therebetween towards the top of the cage 100. In other words, when the top of the door 114 is pushed inwards, or the bottom of the door 114 pulled upwards, the top of the door 114 and the bottom of the door 114 will travel up to essentially the same height so that the door 114 lays flat, parallel, and up against the roof 112.

To retain the door 114 in the open position during loading, door hooks 128 towards the top of the tracks 126 can be included to retain the lower horizontal rod 118. When the lower horizontal rod 118 rests inside of the door hooks 128, the cage 100 is in a loading position whereby the door 114 will not become dislodged and livestock may be easily placed into the cage 100. Stops 130 can be included to prevent the door 114 from coming out of the tracks 126 and/or door hooks 128.

Figure 2:
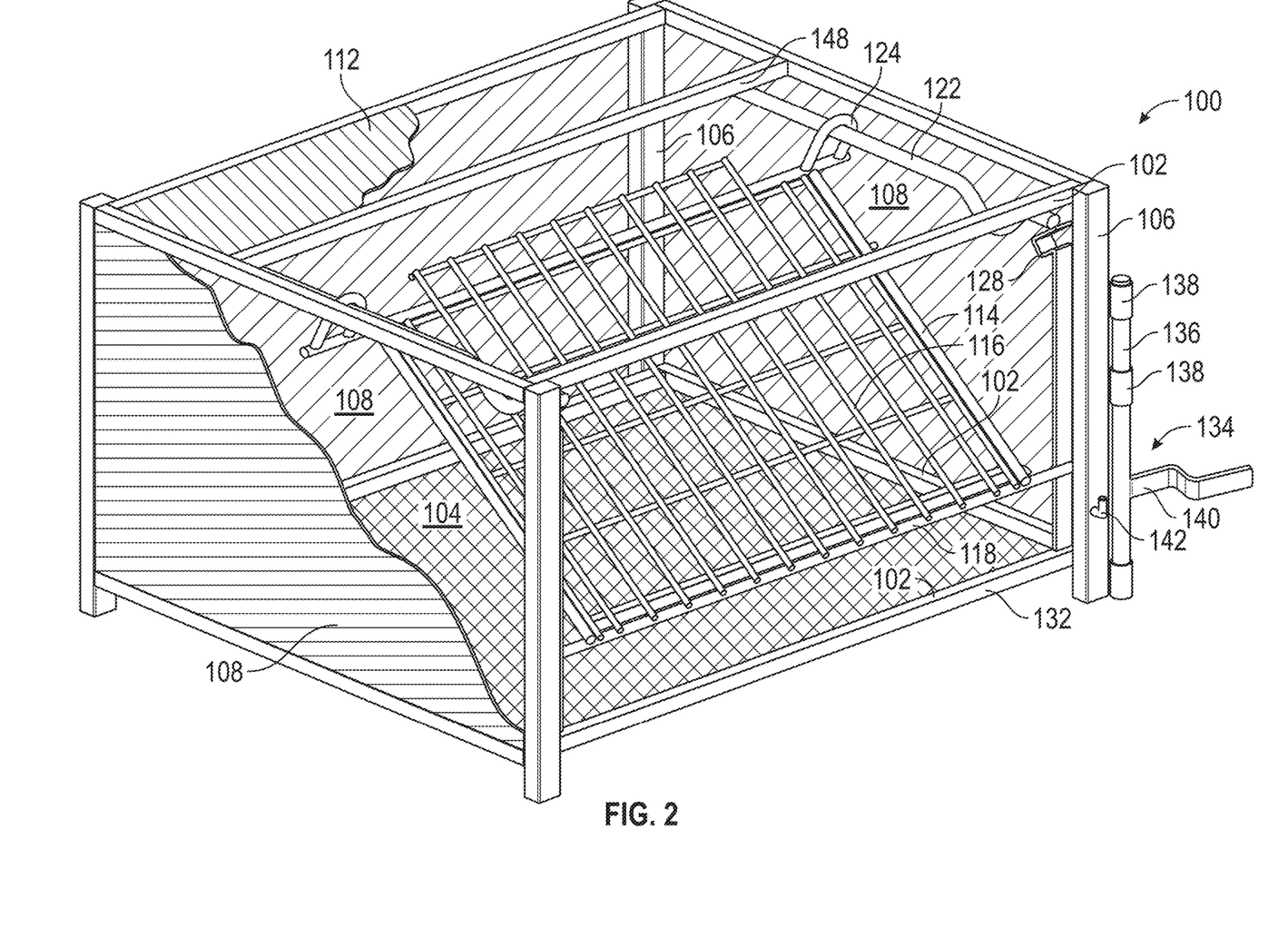
FIG. 2 shows a perspective view of the cage of FIG. 1 in a partially open position, according to some aspects of the present disclosure.
Figure 3:
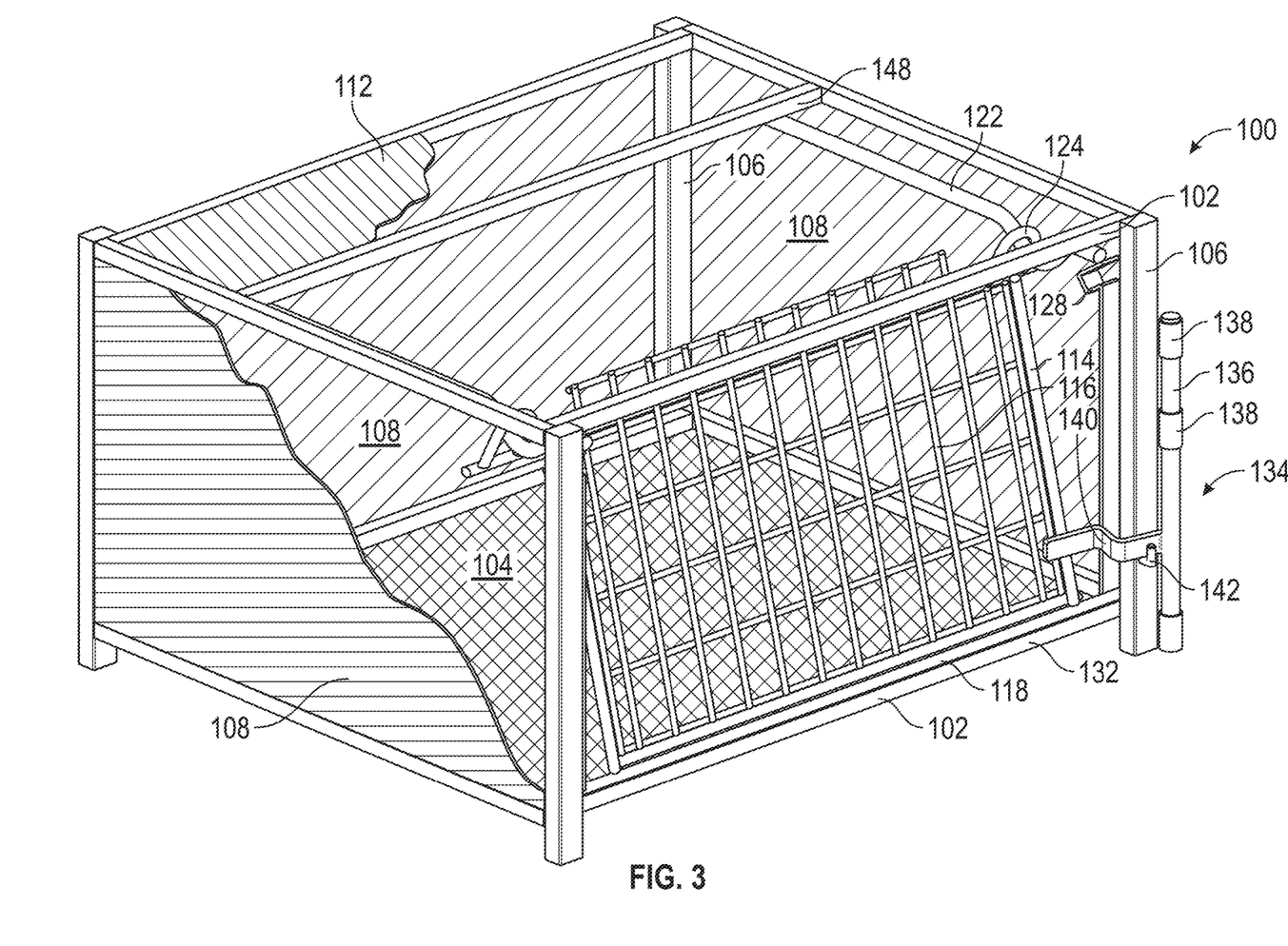
FIG. 3 shows a perspective view of the cage of FIG. 1 in a substantially closed and transport position, according to some aspects of the present disclosure.

After livestock is loaded into the cage 100, the cage 100 can transition from an open position to a closed position by pushing the door 114 outwards, downwards along the tracks 126, and towards the outside of the cage 100. While transitioning, the door 114 and cage 100 move through a partially open position, as shown in FIG. 2. The door 114 continues to move towards the closed position until the lower horizontal rod 118 makes contact with a detent rod 132. The detent rod 132 attaches to the frame 102 and/or other suitable location towards the bottom of the opening in the cage 100. The detent rod 132 is set out towards the face of the cage 100, acts as a detent to hold the bottom of the doors 114 against the tracks 126, and catches the lower horizontal rod 118 until further latching can occur. Once caught, the cage 100 is in the closed position, as shown in FIG. 3.

To retain the door 114 in the closed position while transporting the livestock, a latching mechanism 134 can be included. The latching mechanism 134 of the cage 100 typically comprises a pipe 136, bar, or other suitable member running vertically along the outermost corner of each leg 106. The pipe 136 extends through several knuckles 138. The knuckles 138 provide stability for the pipe 136 and allow the pipe 136 to swivel. Attached to the pipe 136 are also metallic pieces which serve as latches 140 for door(s) 114. For example, there can be two latches 140 for each door 114, one from each leg 106 on that end of the cage 100. The latches 140 are welded to the pipe 136 and are oriented so that operating one latch 140 will operate all of the latches 140 which are attached to the pipe 136, even in instances where the latching mechanism 134 is common to cages 100 of multiple floors.

To retain the latching mechanism 134 in the latched position, and thus the door 114 in the closed position, during transport of the livestock, a keeper 142 may be included. For example, the keeper 142 may simply be a hook welded into the leg 106. There need only be one keeper 142 for each position due to swiveling nature of the pipe 136, however more may be provided. The keepers 142 will hold the latching mechanism 134 in the open or closed position until released by an operator to be put in the other position. For example, the latching mechanism 134 can be picked up slightly, out of the keeper(s) 142 associated with the first position, swung around, and set into the keeper(s) 142 associated with the other position.

The present disclosure is not to be limited to the specific type of latching mechanism 134 described above. One of ordinary skill in the art will appreciate other mechanisms, such as other latches, an object emulating the function of a deadbolt, or biasing mechanism (e.g., springs, magnets, etc.), could be used as the latching mechanism 134 to retain the door 114 in the closed position while transporting the livestock.

Figure 4:
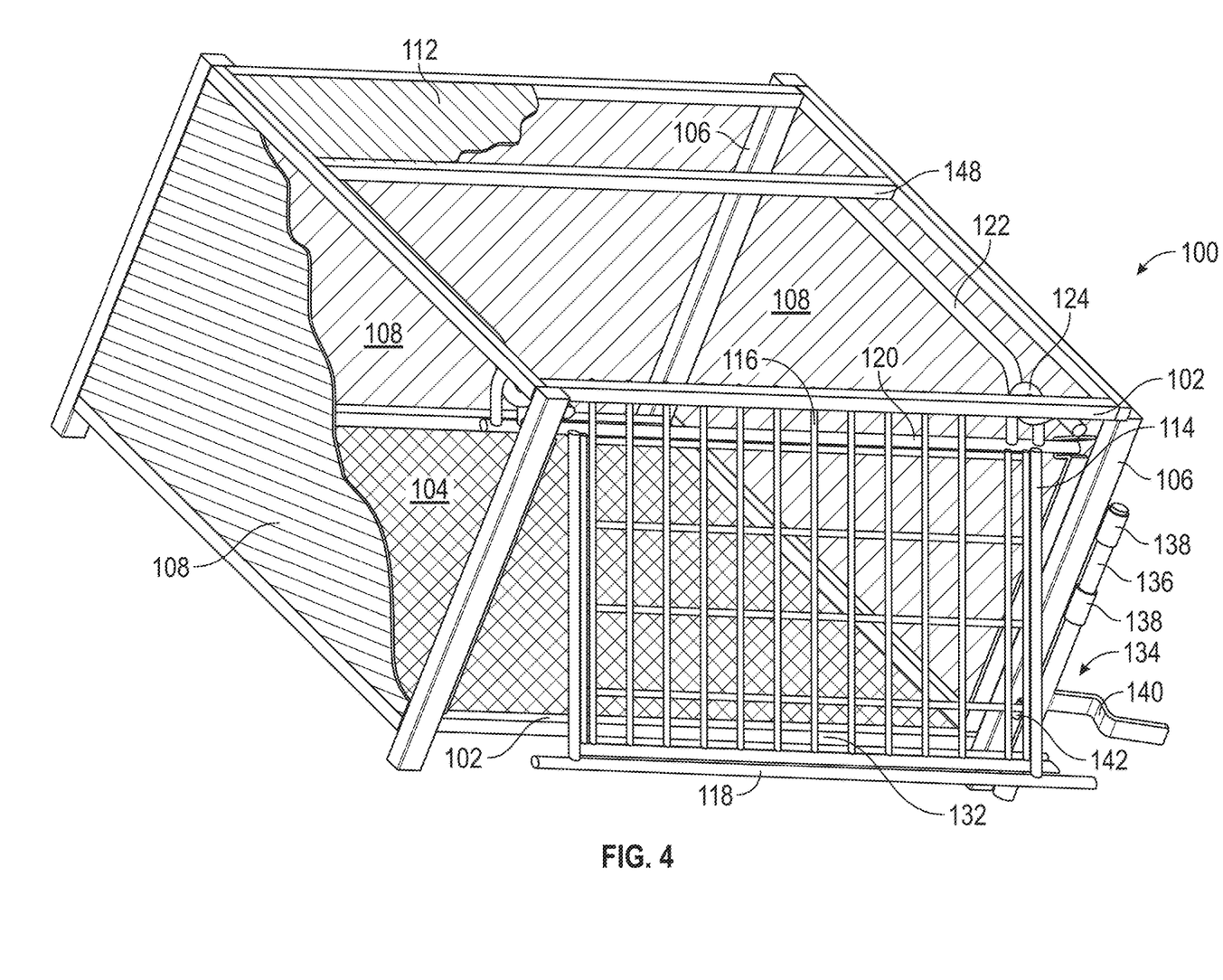
FIG. 4 shows a perspective view of the cage of FIG. 1 in an unloading position, according to some aspects of the present disclosure.
Figure 5:
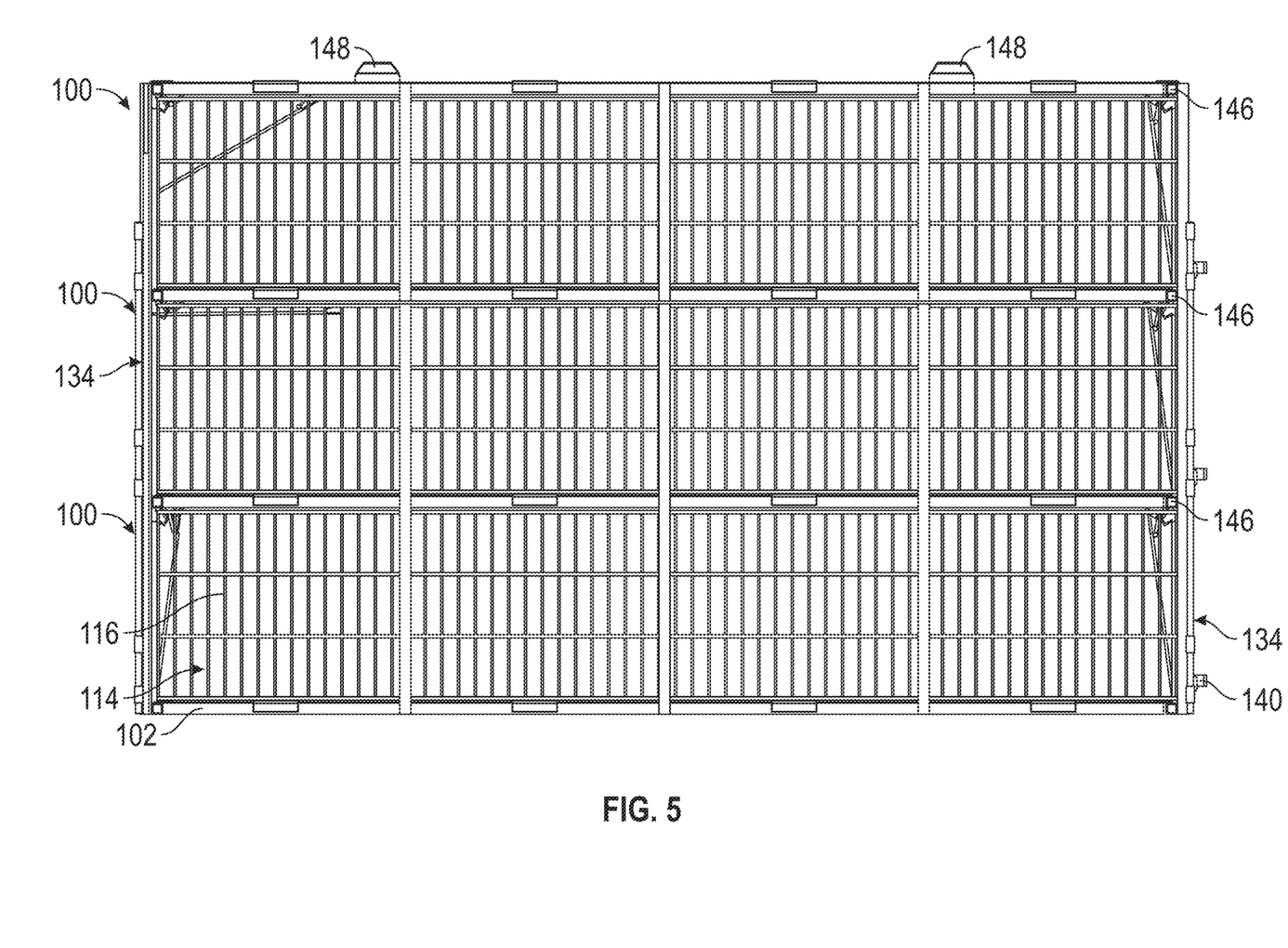
FIG. 5 shows a front elevation view of a 3-high removable cage emphasizing stackability, according to some aspects of the present disclosure.
Figure 6:
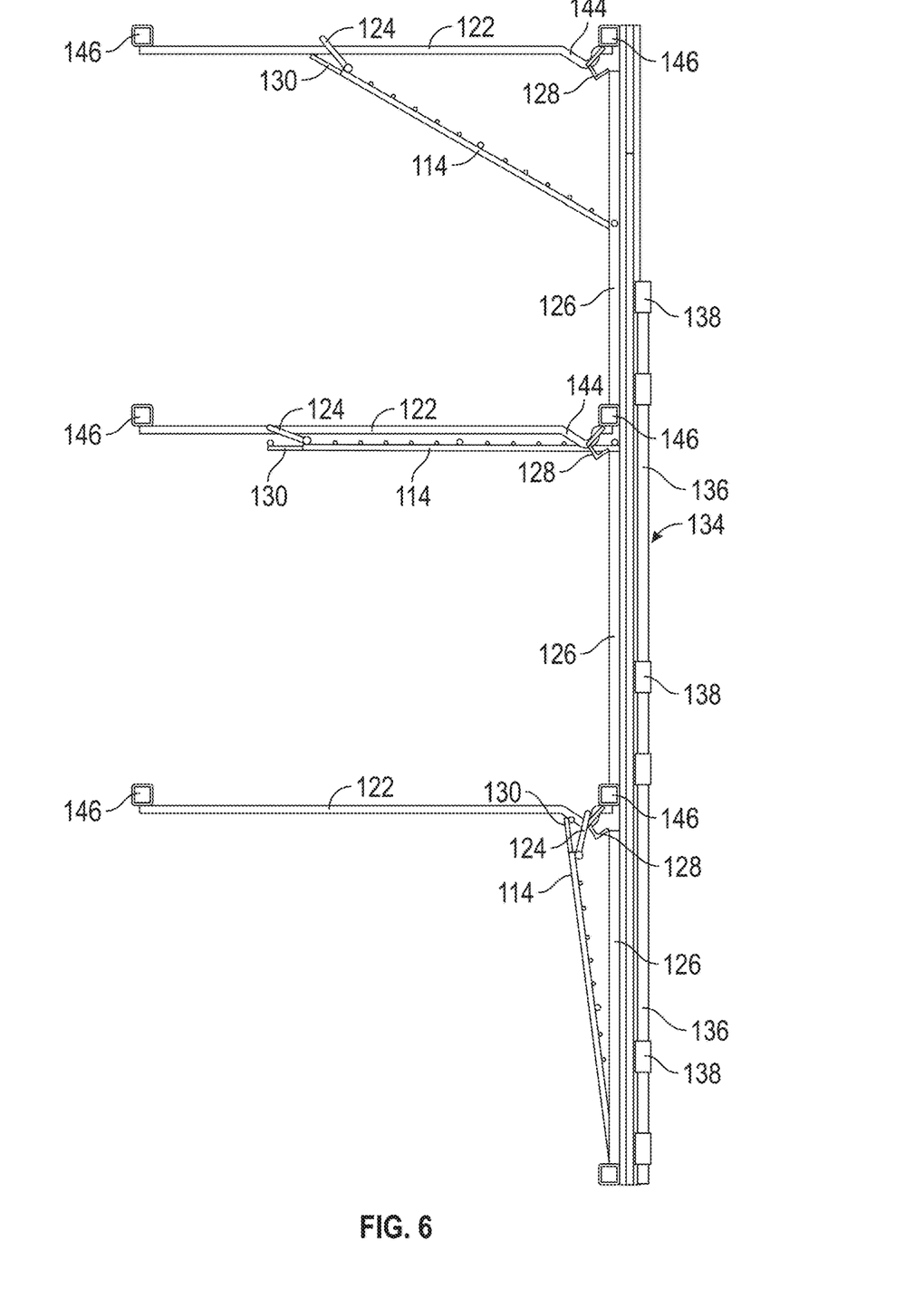
FIG. 6 shows a detailed and side elevation view the 3-high removable cage of FIG. 5 emphasizing fuller automation and stability, according to some aspects of the present disclosure.

In the closed position, the door 114 is at a slight angle, leaning, with the top of the door 114 towards the back of the cage 100. This slight angle is caused in part due to hinge points 144 included in the slide rods 122. The hinge point 144 is essentially just a portion of slide rod 122 nearest the outside of the door frame having a bent crook in the shape of the letter "V" or the letter "U". After the livestock has been transported from one location to another and it is desired to unload the livestock from the cages 100, the hinge point 144 will be the primary mechanism which allows for the door 114 to swing outward into an unloading position. The unloading position will occur as a result of the cage 100 being tipped forward, as shown in FIG. 4. As the cage 100 is tipped forward, the livestock will be pushed towards the front of the cage 100 due to gravity, the weight of the livestock will then push outward on the door 114, the lower horizontal rod 118 will release from the detent rod 132, and as a result, the livestock will fall out of the cage 100.

After the livestock is removed from the cage 100, the cage be pushed inwards, upwards along the tracks 126, and towards the inside of the cage 100 to the open position, as shown in FIG. 1, to store the cage 100 and/or load additional livestock into the cage 100 for further transport. Alternatively, the cage 100 may be stored in the closed position shown in FIG. 3 before being used for further loading and/or transport of livestock. In this instance, it is beneficial to put the latching mechanism 134 in the latched position, as doing so will push any doors 114 that are not in contact with the detent rod 132 back towards and to become caught by the detent rod 132.

When storing or transporting said cages 100, it may be preferred, depending on the weight of the cage 100, to use automatic means, such as a hoist, to move cages 100 around a warehouse or onto or off of a truck. To do so, the operator should use the hoist to grab onto one or more of the lifting lugs 146 included at upper corners of the cage 100. The lifting lugs 146 facilitate loading, unloading, and stacking the cages 100. The lifting lugs 146 provide an opening that can be used to insert a chain, strap, or other suitable means of attachment for the cage 100 to a truck, trailer bed, or other machine used for transport. To stack the cages 100, a stacking cradle 148, or bent portion of the cage 100, allows cages 100 directly above to nest within a lower cage 100. Once loaded, the cages 100 can be chained down to the truck and/or trailer bed for transportation.

From the foregoing, it can be seen that the present invention accomplishes at least all of the stated objectives.

LIST OF REFERENCE NUMERALS

The following reference numerals and descriptors are not exhaustive, nor limiting, and include reasonable equivalents. If possible, elements identified by a reference numeral may replace or supplement any element identified by another reference numeral.
100 cage
102 frame
104 floor (e.g., solid floor panel)
106 legs
108 sidewalls
110 panels
112 roof (e.g., solid roof panel)
114 door
116 grid wire
118 lower horizontal rod
120 upper horizontal rod
122 slide rods 124 door rings
126 tracks
128 door hooks
130 stops
132 detent rod
134 latching mechanism
136 pipe
138 knuckles
140 latch
142 keeper
144 hinge point
146 lifting lug
148 stacking cradle The present disclosure is not to be limited to the particular embodiments described herein. The following claims set forth a number of the embodiments of the present disclosure with greater particularity.

What is claimed is:

1. A stackable cage for holding and transporting livestock comprising:
   a floor;
   a sidewall extending perpendicularly from the floor in an upward direction until the sidewall meets a slide rod substantially parallel with the floor;
   a substantially vertical track; and
   a door comprising:
   towards a top of the door, a substantially horizontal rod slidable along the slide rod; and
   towards a bottom of the door, an attachment to the substantially vertical track to allow the door to ride along the substantially vertical track as the door is moved from a closed position to an open position.

2. The stackable cage of claim 1 further comprising:
   legs extending perpendicularly from the floor in an upward direction;
   wherein the sidewall is located between at least two of the legs; and
   further wherein the substantially vertical track is attached to at least one of the legs or the sidewall.

3. The stackable cage of claim 1 wherein the sidewall comprises wire panels to keep livestock contained within the stackable cage.

4. The stackable cage of claim 1 wherein the sidewall comprises solid panels to block wind and provide shelter for the livestock during transport.

5. The stackable cage of claim 1 wherein the door comprises grid wire.

6. The stackable cage of claim 1 wherein the slide rod comprises a hinge point about which the substantially horizontal rod pivots and thus allows the door to swing outwardly as the stackable cage is tipped forward.

7. The stackable cage of claim 1 wherein the substantially horizontal rod is attached to a door ring thus allowing the substantially horizontal rod to slide along the slide rod.

8. The stackable cage of claim 1 further comprising a door hook towards a top of the substantially vertical track to retain the door in the open position.

9. The stackable cage of claim 1 further comprising a stop to prevent the door from coming out of the substantially vertical track or the door hook.

10. The stackable cage of claim 1 further comprising a detent rod within the floor to, at least temporarily, retain the attachment to the substantially vertical track while the stackable cage is in the closed position.

11. The stackable cage of claim 1 further comprising a latching mechanism for preventing the door from swinging outward during transport.

12. The stackable cage of claim 1 further comprising a lifting lug at an upper corner of the sidewall.

13. An assembly of stackable cages having multiple floors comprising:
   at least two stackable cages, each stackable cage comprising:
   a floor;
   a sidewall extending perpendicularly from the floor in an upward direction until the sidewall meets a slide rod substantially parallel with the floor;
   a substantially vertical track; and
   a door comprising:
   towards a top of the door, a substantially horizontal rod slidable along the slide rod; and
   towards a bottom of the door, an attachment to the substantially vertical track to allow the door to ride along the substantially vertical track as the door is moved from a closed position to an open position;
   wherein at least one of the at least two stackable cages is not on a top floor of the multiple floors and does not include a roof; and
   further wherein only stackable cages on the top floor include a roof.

14. The assembly of stackable cages of claim 13 further comprising a latching mechanism comprising:
   a substantially vertical pipe traversing the multiple floors, said substantially vertical pipe passing through knuckles allowing hinged movement;
   a latch at each floor preventing the corresponding door from swinging outward during transport; and
   a keeper for retaining at least one latch in a transport position.

15. The assembly of stackable cages of claim 14 wherein the keeper is a hook attached to a stackable cage on a bottom floor of the multiple floors.

16. The assembly of stackable cages of claim 13 wherein each stackable cage further comprises a cradle towards a top of the sidewall for retaining another stackable cage.

* * * * *